(No Model.)
E. F. STECK.
PROTECTOR FOR FUSIBLE SPRINKLER PLUGS.
No. 598,683. Patented Feb. 8, 1898.
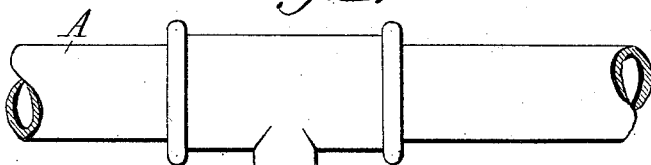
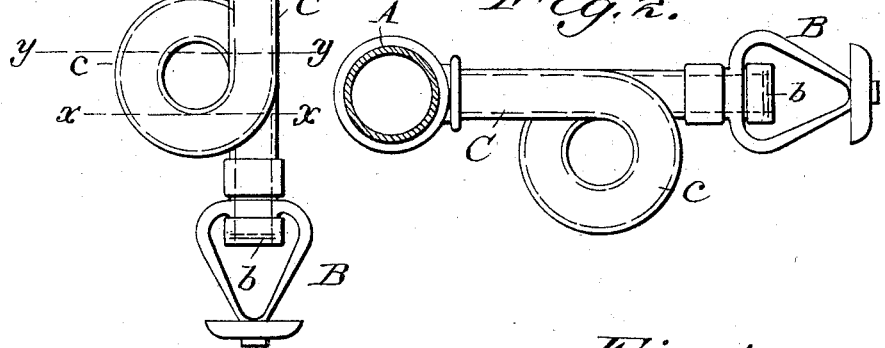
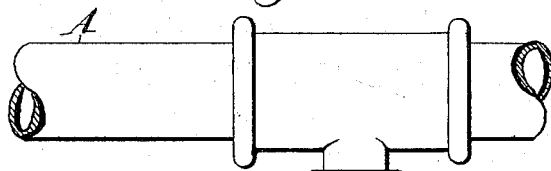
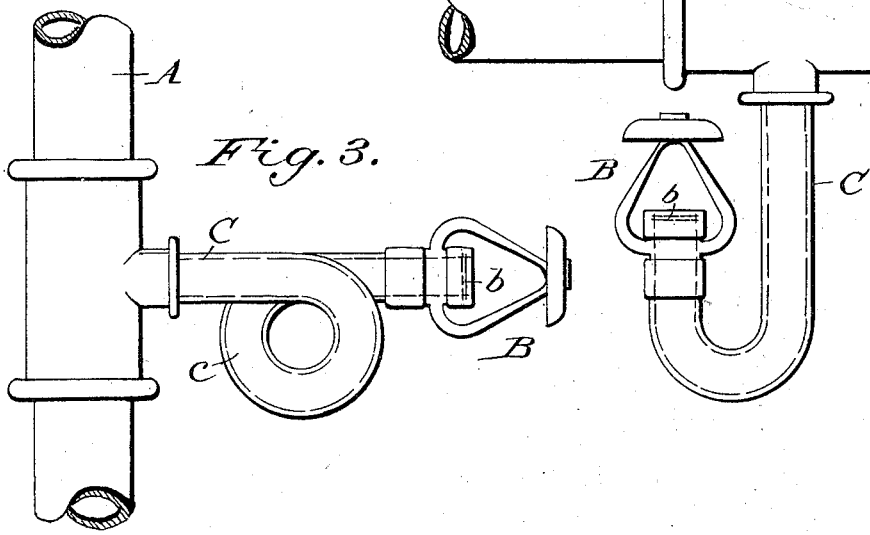
WITNESSES:
W. H. Pumphrey
H. L. Lovett
INVENTOR
Ernst F. Steck
BY
ATTORNEYS

UNITED STATES PATENT OFFICE.

ERNST F. STECK, OF CHICAGO, ILLINOIS, ASSIGNOR TO THE FIRE EXTINGUISHER MANUFACTURING COMPANY, OF SAME PLACE AND NEW YORK, N. Y.

PROTECTOR FOR FUSIBLE SPRINKLER-PLUGS.

SPECIFICATION forming part of Letters Patent No. 598,683, dated February 8, 1898.

Application filed November 17, 1896. Serial No. 612,423. (No model.)

*To all whom it may concern:*

Be it known that I, ERNST F. STECK, a citizen of the United States, residing at Chicago, in the county of Cook and State of Illinois, have invented certain new and useful Improvements in Protectors for Fusible Sprinkler-Plugs, of which the following is a specification.

This invention relates to improvements in automatic fire-extinguishing devices; and it consists in means whereby the sprinklers ordinarily used in such devices may be placed in any desired position with relation to the main supply-pipe. As ordinarily used the sprinklers or the branch pipes leading thereto are made to extend upwardly from the main supply-pipe. In many cases, however, it would be desirable to have the sprinkler extend directly outward or even downward—
for example, when it is desirable to run the supply-pipe vertically or to place it close against the wall or ceiling of a room. With the ordinary construction and connection of sprinklers, however, such a disposition would induce faulty operation or total inoperation of the fusible devices, since the water flowing through the supply-pipe to any opened sprinkler would at once run into all the other sprinklers through the branch connections thereof, displacing the air therein. The sprinklers would then be rendered so sluggish in responding to heat on account of the cooling effect of the water in contact with them that they would be of little service in case of the occurrence of fire near them.

My invention consists in forming a trap for the air in the branch pipe near the sprinkler, said trap consisting of a return or upward bend in said pipe, whereby the air is locked or trapped in the space between the said bend and the sprinkler-valve and prevented from rising or bubbling up through the water, which latter is therefore prevented from passing the trap. It may be observed that such a trap is of no detriment but in fact in some respects a positive advantage when used with an upwardly-extending sprinkler connection, and in application Serial No. 594,421, filed June 5, 1896, I have shown, described, and broadly claimed a return-bend on such a connection forming a trap; but the said trap when applied to an outwardly or downwardly extending sprinkler branch subserves additional functions and has new and distinct advantages, as above stated.

In the accompanying drawings, illustrating my invention, Figure 1 is a side view of a sprinkler with its trapped branch pipe and the adjacent portion of the supply-pipe, the latter being horizontal and the branch pipe and sprinkler depending therefrom. Fig. 2 is a similar view, the branch pipe and sprinkler being, however, shown as extending outwardly. Fig. 3 is a side elevation of portion of a vertical supply-pipe with the trapped branch pipe and sprinkler extending therefrom. Fig. 4 shows a modified form of my invention.

In the drawings, A represents a supply-pipe, through which the water or other fire-extinguishing fluid is delivered to the sprinklers. In Fig. 1 this is shown as arranged horizontally, and the sprinkler B, having a valve $b$ and connecting branch pipe C, depends from the same so as to project directly downward.

$c$ is the return-bend or trap in the connecting or branch pipe C.

It will be seen that when the water flows through the supply-pipe C, for example, on its way to open sprinklers at other parts of the system, it will at once fall into and displace the air in the adjacent portions of the branch pipes; but as soon as the water in the trap reaches the level indicated at $x$ the air between this point and the sprinkler becomes trapped or locked in. The water will then continue to rise in the trap only until the pressure of the confined air equals the pressure of the water column, the level being indicated by the line $y$. At this level the water will remain until the main supply-pipe is emptied, when it will fall to a lower level, just sufficient to balance the water still remaining in the portion of branch C adjacent to the supply-pipe. Thus at no time is water allowed to pass beyond the trap until the valve of the sprinkler is opened, when the air is driven out through the valve-opening by the water.

By making the branch pipe C project downwardly from the supply-pipe, as indicated in Fig. 1, I am enabled to bring said supply-pipe close up against the ceiling of the inclosing room, which is often a matter of considerable advantage.

In some cases it is desirable to place the supply-pipe close against the wall of the room, in which case the branch pipe and sprinklers should project outwardly, as shown in Fig. 2, wherein the parts are in every other respect the same as in Fig. 1, and the operation thereof also identical.

My invention may with advantage even be applied to standing or vertical pipes, the disposition in that case being as indicated in Fig. 3, and the arrangement and operation of the sprinkler and connected parts identical with those of Fig. 2.

In case it is not necessary to have the sprinkler extend away from the pipe, but it is still desirable to have it lower than the supply-pipe, an effective trap can be formed by a single upward or return bend in the pipe, as indicated in Fig. 4, the air above the bend being trapped in this case as in case of the form shown in Fig. 1.

Having thus described my invention, what I claim as new, and desire to secure by Letters Patent, is—

1. The combination with the supply-pipe and an automatic sprinkler, having a valve of a pipe connecting said sprinkler to said pipe at a point as high as or higher than the sprinkler-valve, and having a return or upward bend therein, so as to form a trap for the air near the sprinkler and prevent displacement of same by the water until the valve is opened.

2. The combination with a supply-pipe of a downturned automatic sprinkler and a pipe leading downward from said supply-pipe to said sprinkler and having a trap or return bend therein, substantially as and for the purpose set forth.

ERNST F. STECK.

Witnesses:
O. S. DOOLITTLE,
L. W. MALLORY.